United States Patent [19]

Sugasawa et al.

[11] Patent Number: 4,484,548
[45] Date of Patent: Nov. 27, 1984

[54] SPLIT TYPE INTERNAL COMBUSTION ENGINE

[75] Inventors: Fukashi Sugasawa, Yokohama; Haruhiko Iizuka, Yokosuka, both of Japan

[73] Assignee: Nissan Motor Company, Limited, Yokohama, Japan

[21] Appl. No.: 206,308

[22] Filed: Nov. 12, 1980

[30] Foreign Application Priority Data

Nov. 15, 1979 [JP] Japan .................. 54-148214

[51] Int. Cl.³ ............................................. F02D 17/00
[52] U.S. Cl. ............................ 123/198 F; 123/481; 60/277; 60/285
[58] Field of Search .............. 123/198 F, 481, 440, 123/489; 60/277, 285

[56] References Cited

U.S. PATENT DOCUMENTS

| | | | |
|---|---|---|---|
| 3,916,622 | 11/1975 | Gospodar | 123/198 F |
| 3,955,363 | 5/1976 | Manderscheid | 123/198 F |
| 4,023,358 | 5/1977 | Maurer et al. | |
| 4,024,850 | 5/1977 | Peter et al. | 123/198 F |
| 4,107,921 | 8/1978 | Fizuka | 123/198 F |
| 4,123,903 | 11/1978 | Hayashi | 60/277 |
| 4,165,610 | 8/1979 | Fizuka et al. | 123/481 |
| 4,186,715 | 2/1980 | Fizuka | 123/198 F |
| 4,245,471 | 1/1981 | Sugasawa et al. | 123/198 F |
| 4,249,374 | 2/1981 | Sugasawa et al. | |
| 4,256,074 | 3/1981 | Sugasawa et al. | 123/198 F |
| 4,319,451 | 3/1982 | Tajima et al. | 123/440 |

FOREIGN PATENT DOCUMENTS 2900953 7/1979 Fed. Rep. of Germany .

Primary Examiner—Ira S. Lazarus
Attorney, Agent, or Firm—Schwartz, Jeffery, Schwaab, Mack, Blumenthal & Koch

[57] ABSTRACT

An internal combustion engine is disclosed which comprises first and second cylinder units each including at least one cylinder, a control circuit responsive to engine load for supplying a mixture of an optimum air/fuel ratio to the first and second cylinder units and for terminating the supply of the mixture to the second cylinder unit when the engine load is below a given value, and an exhaust system having therein a catalytic converter. An emergency circuit is provided for forcing the control circuit to lean out the air/fuel ratio in response to an increase in the temperature of the catalytic converter.

5 Claims, 6 Drawing Figures

CATALYZER TEMPERATURE

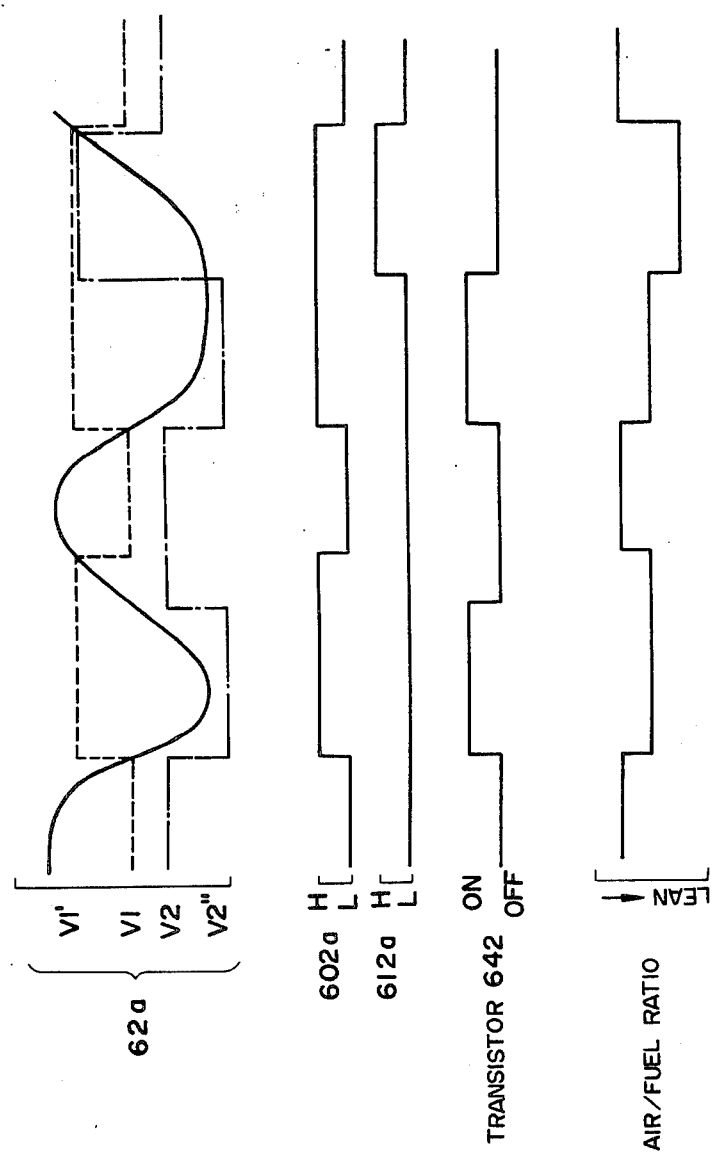

SPLIT TYPE INTERNAL COMBUSTION ENGINE

BACKGROUND OF THE INVENTION

1. Field of the Invention

This invention relates to improvements in internal combustion engines of the split type operable on less than all of its cylinders when the engine load is below a given value.

2. Description of the Prior Art

It is known and desirable to increase the efficiency of a multicylinder internal combustion engine by reducing the number of cylinders on which the engine operates under predetermined engine operating conditions, particularly conditions of low engine load. Control systems have already been proposed which disable a number of cylinders in a multicylinder internal combustion engine by suppressing the supply of fuel to certain cylinders or by preventing the operation of the intake and exhaust valves of selected cylinders. Under given load conditions, the disablement of some of the cylinders of the engine increases the load on those remaining in operation and, as a result, the energy conversion efficiency is increased.

It is common practice to introduce exhaust gases into the disabled cylinders through an EGR valve adapted to open under given load conditions and to prevent the introduced exhaust gases from flowing to the cylinders remaining in operation by the use of a stop valve adapted to close in timed relation with the opening of the EGR valve. This is effective to suppress pumping loss in the disabled cylinders and attain higher fuel economy.

One difficulty with such split type internal combustion engine is the tendency to cause imperfect combustion and to produce a great amount of unburned exhaust components should any trouble occurs with engine components such as EGR or stop valves. The unburned components flow into the catalytic converter provided in the exhaust system and react therein to overheat the catalytic converter. This results in a severe reduction of the service life of the catalytic converter.

The present invention provides an improved split type internal combustion engine equipped with a safety means for keeping the catalytic converter from overheating if trouble occurs with certain engine components such as EGR or stop valves.

SUMMARY OF THE INVENTION

The present invention provides an internal combustion engine which comprises first and second cylinder units each including at least one cylinder, a control circuit responsive to engine load for supplying a mixture of an optimum air/fuel ratio to the first and second cylinder units and for terminating the supply of the mixture to the second cylinder unit when the engine load is below a given value, and an exhaust system having therein a catalytic converter for removing pollutants from the exhaust gases flowing therethrough from the cylinders. An emergency circuit 60 is provided for forcing the control circuit to lean out the air/fuel ratio in response to an increase in the temperature of the catalytic converter. The emergency circuit is effective to decrease the temperature of the catalytic converter when an abnormal increase occurs in the temperature of the catalytic converter due to problems with certain engine components to thereby safeguard the catalytic converter from overheating.

Preferably, the emergency circuit comprises a first comparator for comparing the temperature of the catalytic converter with a first reference value and providing a first command signal when the converter temperature is higher than the reference value, and a second comparator for comparing the temperature of the catalytic converter with a second reference value higher than the first reference value and providing a second command signal when the converter temperature is higher than the second reference value. The first comparator is adapted to decrease the first reference value to a given level upon the occurrence of the first command signal. The second comparator is adapted to decrease the second reference value to a given level upon the occurrence of the second command signal. The first command signal is applied to the control circuit which thereby leans out the air/fuel ratio to a first predetermined level and terminates the supply of the mixture to the second cylinder unit. The control circuit is responsive to the second command signal for leaning out the air/fuel ratio to a second predetermined level leaner than the first predetermined level.

Means may be further provided for increasing the second reference value to a predetermined level for a predetermined period of time in response to the first command signal. In addition, means may be provided for decreasing the first and second reference values to a sufficient level to force the first and second comparators to produce the first and second command signals when the number of occurrence of the first command signal exceeds a predetermined value indicating a problem with an engine component. Preferably, this means is adapted to provide an alarm when the number of occurrence of the first command signal exceeds the predetermined value.

Additional objects, advantages and novel features of the invention will be set forth in part in the description which follows, and in part will become apparent to those skilled in the art upon examination of the following or may be learned by practice of the invention. The objects and advantages of the inventon may be realized and attained by means of the instrumentalities and combinations particularly pointed out in the appended claims.

BRIEF DESCRIPTION OF THE DRAWINGS

The present invention will be described in greater detail by reference to the following description taken in connection with the accompanying drawings, in which like reference numerals refer to the same or corresponding parts, and wherein:

FIG. 6 contains certain waveforms used to explain the operation of the emergency circuit of FIG. 5.

DESCRIPTION OF THE PREFERRED EMBODIMENTS

Figure 1:
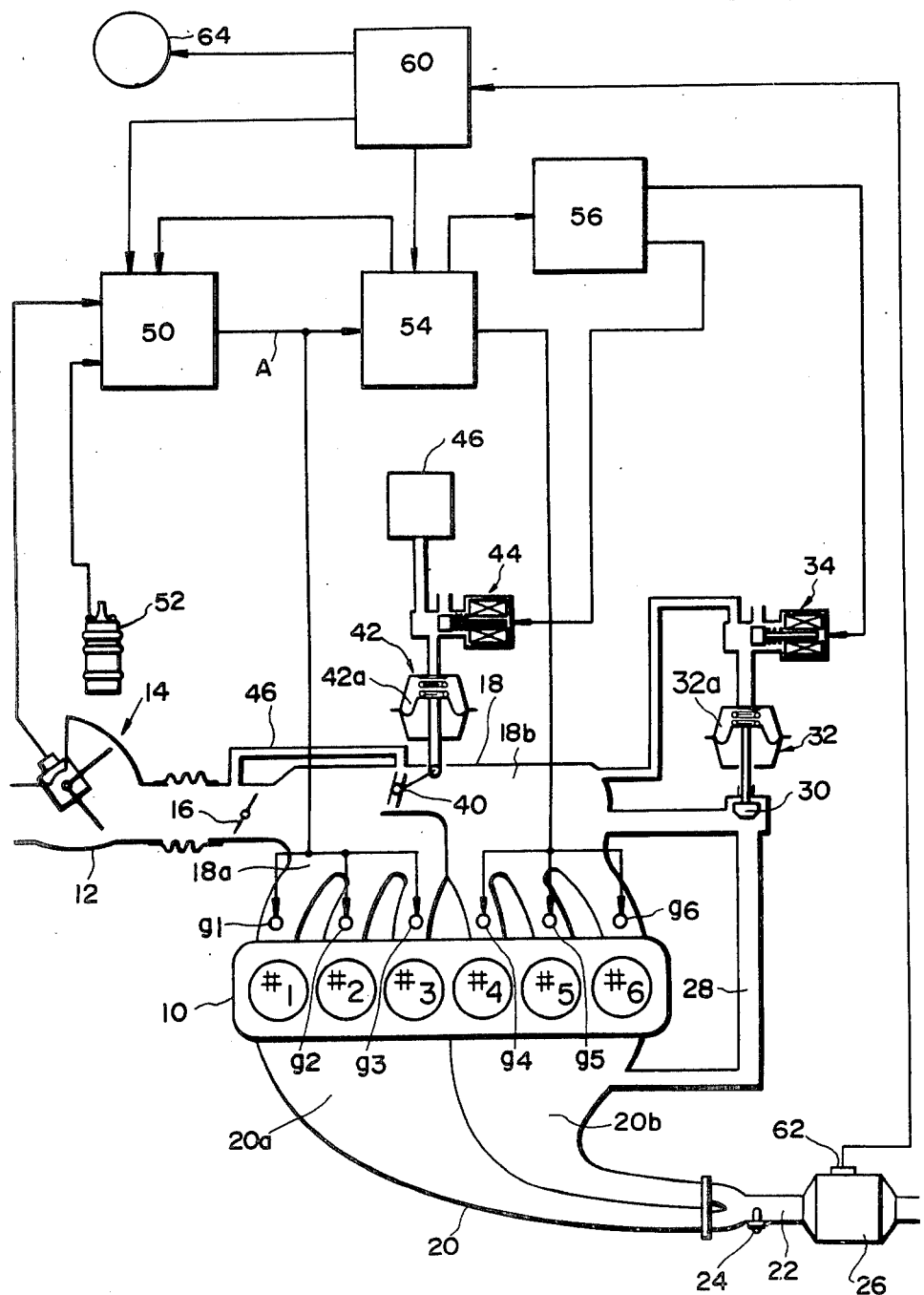
FIG. 1 is a schematic view showing one embodiment of a split type internal combustion engine constructed in accordance with the present invention.

Referring now to FIG. 1, the reference numeral 10 designates an engine block containing therein an active cylinder unit including three cylinders #1 to #3 being always active and an inactive cylinder unit having three cylinders #4 to #6 being inactive when the engine load is below a predetermined value. Air is supplied to the engine through an air induction passage 12 provided therein with an airflow meter 14 and a throttle valve 16 drivingly connected to the accelerator pedal (not shown) for controlling the flow of air to the engine. The induction passage 12 is connected downstream of the throttle valve 16 to an intake manifold 18 which is divided into first and second intake passages 18a and 18b. The first intake passage 18a leads to the active cylinders #1 to #3 and the second intake passage 18b leads to the inactive cylinders #4 to #6.

The engine also has an exhaust manifold 20 which is divided into first and second exhaust passages 20a and 20b leading from the active cylinders #1 to #3 and the inactive cylinders #4 to #6, respectively. The exhaust manifold 20 is connected at its downstream end to an exhaust duct 22 provided therein with an exhaust gas sensor 24 and an exhaust gas purifier 26 located downstream of the exhaust gas sensor 24. The exhaust gas sensor 24 may be in the form of an oxygen sensor which monitors the oxygen content of the exhaust and is effective to provide a signal indicative of the air/fuel ratio at which the engine is operating. The exhaust gas purifier 26 may be in the form of a three-way catalytic converter which effects oxidation of HC and CO and reduction of NOx so as to minimize the emission of pollutants through the exhaust duct 22. The catalytic converter exhibits its maximum performance at the stoichiometric air/fuel ratio. In view of this, it is desirable to maintain the air/fuel ratio at the stoichiometric value.

An exhaust gas recirculation (EGR) passage 28 is provided which has its one end opening into the second exhaust passage 20b and the other end thereof opening into the second intake passage 18b. The EGR passage 28 has therein an EGR valve 30 which opens to permit recirculation of exhaust gases from the second exhaust passage 20b into the second intake passage 18b so as to minimize pumping losses in the inactive cylinders #4 to #6 during a split engine mode of operation where the engine operates on the three cylinders #1 to #3. The EGR valve 30 closes to prevent exhaust gas recirculation during a full engine mode of operation where the engine operates on all of the cylinders #1 to #6.

The EGR valve 30 is driven by a first pneumatic valve actuator 32 which includes a diaphragm spreaded with a casing to define therewith two chambers on the opposite sides of the diaphragm, and an operating rod having its one end centrally fixed to the diaphragm and the other end thereof drivingly connected to the EGR valve 30. The working chamber 32a is connected to the outlet of a first three-way solenoid valve 34 which has an atmospheric inlet communicating with atmospheric air and a vacuum inlet connected to the second intake passage 18b. The first solenoid valve 34 is normally in a position providing communication between the first valve actuator working chamber 32a and atmospheric air so as to close the EGR valve 30. During a split engine mode of operation, the first solenoid valve 34 is moved to another position where communication is established between the first valve actuator working chamber 32a and the second intake passage 18b, thereby opening the EGR valve 30.

The second intake passage 18b is provided at its entrance with a stop valve 40 which is normally open to permit the flow of fresh air through the second intake passage 18b into the inactive cylinders #4 to #6. The stop valve 40 closes to block the fresh air flow to the inactive cylinders #4 to #6 during a split engine mode of operation. The stop valve 40 may be in the form of a double-faced butterfly valve having a pair of valve plates positioned in spaced-parallel relation to each other. A conduit 46 is provided which has its one end opening into the induction passage 12 at a point upstream of the throttle valve 16 and the other end thereof opening into the second intake passage 18b, the other end being in registry with the space between the valve plates when the stop valve 40 is at its closed position. Air, which is substantially at atmospheric pressure, is introduced through the conduit 46 into the space between the valve plates so as to ensure that the exhaust gases charged in the second intake passage 18b cannot escape into the first intake passage 18a when the stop valve 40 closes.

The stop valve 40 is driven by a second pneumatic valve actuator 42 which is substantially similar to the first valve actuator 32. The working chamber 42a of the second valve actuator 42 is connected to the outlet of a second three-way solenoid valve 44 which has an atmospheric inlet communicating with atmospheric air and a vacuum inlet connected to a vacuum tank 46. The second solenoid valve 44 is normally in a position providing communication between the second valve actuator working chamber 42a and atmospheric air so as to open the stop valve 40. When the engine operation is in a split engine mode, the second solenoid valve 44 is moved to another position where communication is established between the second valve actuator working chamber 42a and the vacuum tank 46 so as to close the stop valve 40.

The reference numeral 50 designates an injection control circuit which provides, in synchronism with engine speed as represented by, for example, spark pulses from an ignition coil 52, a fuel-injection pulse signal of pulse width proportional to the air flow rate sensed by the airflow meter 14 and corrected in accordance with an air/fuel ratio indicative signal from the exhaust gas sensor 24. The fuel-injection pulse signal is applied directly to fuel injection valves $g_1$ to $g_3$ for supplying fuel to the respective cylinders #1 to #3 and also through a split engine operating circuit 54 to fuel injection valves $g_4$ to $g_6$ may be in the form of an ON-OFF type solenoid valve adapted to open for a period corresponding to the pulse width of the fuel-injection pulse signal.

The split engine operating circuit 54 determines the load at which the engine is operating from the pulse width of the fuel injection pulse signal. At high load conditions, the split engine operating circuit 54 permits the passage of the fuel-injection pulse signal from the injection control circuit 50 to the fuel injection valves $g_4$ to $g_6$ and provides a high load indicative signal to a valve drive circuit 56. When the engine load falls below a given value, the split engine operating circuit 54 blocks the flow of the fuel-injection pulse signals from the injection control circuit 50 to the fuel injection valves $g_4$ to $g_6$ and provides a low load indicative signal to the valve drive circuit 56.

The valve drive circuit 56 is responsive to the high load indicative signal from the split engine operating circuit 54 to hold the first and second three-way valves 34 and 44 in their normal positions so as to close the EGR valve 30 and open the stop valve 40. The valve drive circuit 56 is also responsive to the low load indicative signal from the split engine operating circuit 54 to change the positions of the first and second three-way solenoid valves 34 and 44, thereby opening the EGR valve 30 and closing the stop valve 40.

During a split engine mode of operation, the amount of air introduced to each of the cylinders #1 to #3 is doubled due to the closing of the stop valve 40. Thus, the amount of fuel supplied to each of the cylinders #1 to #3 during the split engine mode must also be doubled. This is accomplished by changing the constant with which the injection control circuit 50 determines the pulse width of the fuel injection pulse signal from a value K for a full engine mode ot a value 2K for a split engine mode which is double the constant K. For this purpose, the split engine operating circuit 54 is adapted to provide a constant change command signal to the injection control circuit 50 which thereby changing the constant from a value K to a value 2K when the engine load falls below a given value.

If, during full engine mode of operation, the EGR valve 30 remains open for any reason, the cylinders #4 to #6 will suction a relatively large amount of exhaust gases and a relatively small amount of fresh air since the EGR passage 28 opens into the second intake passage 18b near the cylinders #4 to #6. Thus, a greater amount of fresh air will flow into the cylinders #1 to #3. Since a controlled amount of fuel for achieving the stoichiometric air/fuel ratio is supplied through each of the fuel injection valves $g_1$ to $g_6$ into the associated cylinders, the cylinders #1 to #3 are supplied with an overlean mixture whereas the cylinders #4 to #6 are supplied with an overrich mixture, thus causing imperfect combustion and the production of a large amount of unburned components within the cylinders. These unburned components are discharged from the cylinders and introduced to the catalytic converter 26 where the unburned components react to overheat the catalytic converter 26, greatly reducing its service life. Similar problems will occur if the stop valve 40 remains closed for any reason during full engine mode of operation. In order to eliminate such problems, the present invention provides a safety device which comprises an emergency circuit 60 responsive to the temperature of the catalytic converter 62 (as sensed by a temperature sensor 62) for providing an emergency signal to the injection control circuit 50 and also for driving an alarm device 64.

Figure 2:
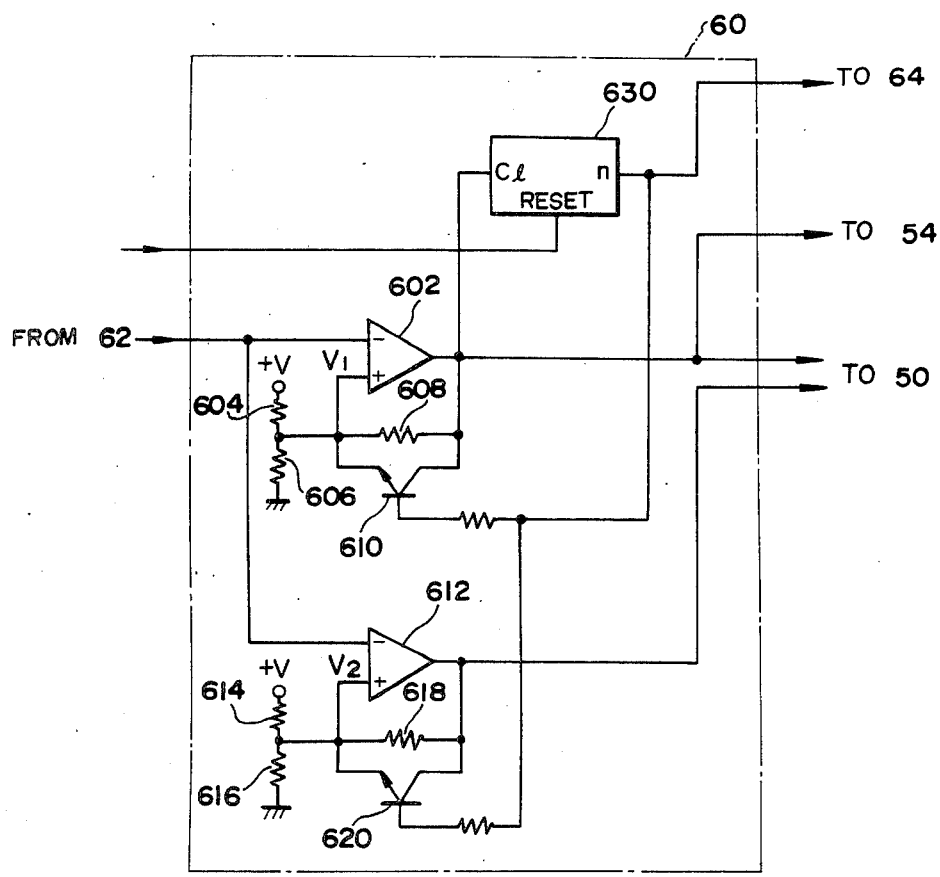
FIG. 2 is a circuit diagram showing the emergency circuit included in the engine of FIG. 1.
Figure 3:
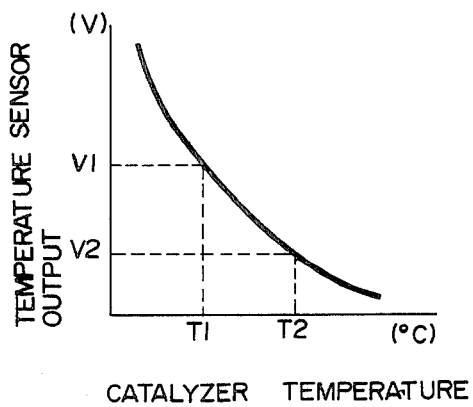
FIG. 3 is a graph of catalytic converter temperature versus temperature sensor output voltage.

Referring to FIG. 2, the emergency circuit 60 will be described in greater detail. The emergency circuit 60 comprises a first comparator 602 which receives at its negative input a voltage signal from the temperature sensor 62 and at its positive input a first reference voltage $V_1$ representing a first reference temperature value $T_1$ determined by the values of resistors 604 and 606 constituting a voltage divider connected between a voltage source designated as $+V$ and ground. It is to be noted that the voltage signal from the temperature sensor 62 is inversely proportional to the temperature of the catalytic converter 26 as shown in FIG. 3.

The first comparator 602 generates a first command signal (high level signal) when the converter temperature exceeds the first predetermined value $T_1$; that is, the temperature indicative signal from the temperature sensor 62 falls below the reference voltage $V_1$. The first command signal is applied to the injection control circuit 50 which thereby changes the constant K to a first value $K_1$, so as to lean out the air/fuel ratio of the mixture supplied to the cylinders and also to the split engine operating circuit 54, so as to shift engine operation to split engine mode. The first constant value $K_1$ is suitably selected to permit the catalytic converter 26 to operate at a reduced temperature when the engine is operating in the split engine mode. A resistor 608 is connected between the positive input and the output of the first comparator 602 to increase the reference voltage $V_1$ to prevent the control from hunting during the occurrence of the first command signal.

The emergency circuit 60 also comprises a second comparator 612 which receives at its negative input the temperature indicative signal from the temperature sensor 62 and at its positive input a second reference voltage $V_2$, which is lower than the first reference voltage $V_1$ and which represents a second predetermined temperature value $T_2$ higher than the first predetermined temperature value $T_1$.

The second comparator 612 generates a second command signal (high level signal) when the converter temperature exceeds the second predetermined value $T_2$; that is, the temperature indicative signal falls below the second reference voltage $V_2$. The second command signal is applied to the injection control circuit 50 to thereby change the constant K to a second value $K_2$ so as to further lean out the air/fuel ratio of the mixture supplied to the cylinders. The second constant value $K_2$ is suitably selected to permit the catalytic converter 26 to operate at a reduced temperature when the engine is operating is in the full engine mode. A resistor 618 is connected between the positive input and the output of the second comparator 612 for increasing the reference voltage $V_2$ to prevent the control from hunting during the occurrence of the second command signal.

Since the cylinders #1 to #3 will be supplied with an overrich mixture if the constant K is changed to the value $K_1$ during the opening of the stop valve 40 or with an overlean mixture if the constant K is changed to the value $K_2$ during the closure of the stop valve 40, it may be considered that the selection of at least one of the constant values $K_1$ and $K_2$ be dependent upon the position of the stop valve. However, an advantage of the present invention is that it can control the constant K according to the temperature of the catalytic converter 26 independently of the position of the stop valve 40.

Assume that the first comparator 602 generates a first command signal to change the constant K to the value $K_1$, the temperature of the catalytic converter 62 will falls if the stop valve 40 is in its closed position. If the stop valve 40 is in its open position, the temperature of the catalytic converter 26 will further increase and exceed the second predetermined value $T_2$. This causes the second comparator 612 to produce a second command signal to change the constant to the value $K_2$ so that the temperature of the catalytic converter 62 will fall.

If any trouble, such as continuous opening of the EGR valve 30, occurs engine component, the first comparator 602 will generate the first command signal repeatingly. In order to detect such a situation, a counter 630 is provided which has an input coupled to the output of the first comparator 602. The output of the counter 630 is connected through a resistor to the base of a first transistor 610 having its emitter-collector circuit connected in parallel with the resistor 608 and also through a resistor to the base of a second transistor 620 having its emitter-collector circuit connected in parallel with the resistor 618. The output of the counter 630 is also connected to the alarm device 64.

The counter 630 counts the number of occurrence of the first command signal from the first comparator 602. When the count exceeds a predetermined value, the counter 630 generates a high level signal to the base of the first and second transistors 610 and 620 which thereby turn on to apply high level signals to the positive inputs of the respective comparators 602 and 612 so as to hold them in the state of producing the first and second command signals, respectively, regardless of the temperature of the catalytic converter 26. Simultaneously, an alarm device 64, responsive to the high level signal from the counter 630, provides an alarm. The alarm device 64 may comprise a lamp or buzzer.

Figure 4:
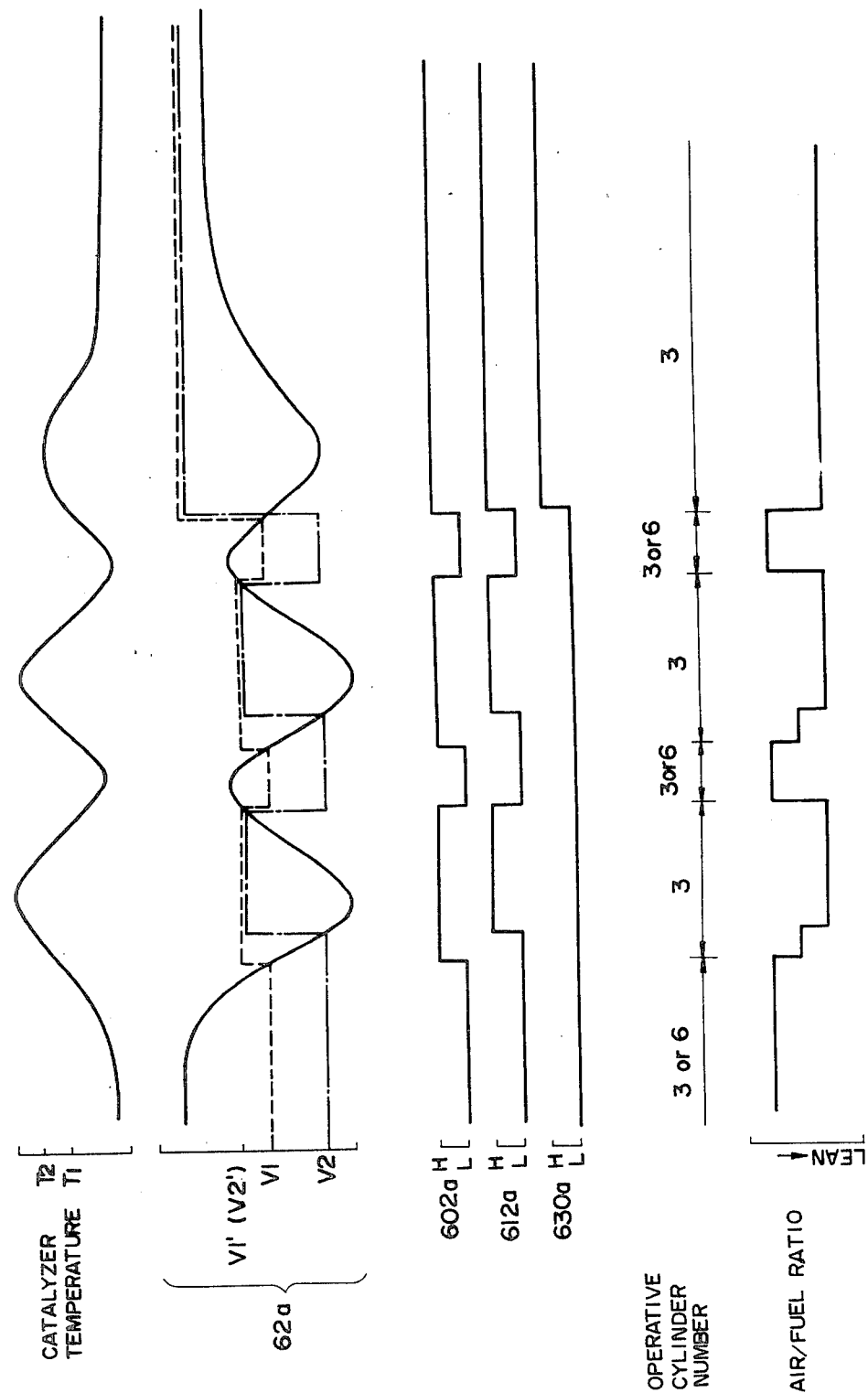
FIG. 4 illustrates certain waveforms used in explaining the operation of the emergency circuit of FIG. 2.

With particular reference now to FIG. 4, the operation of the emergency circuit 60 will be further described.

Assume first that the temperature of the catalytic converter 26 is below the first predetermined value $T_1$ and that the output of the temperature sensor 62 is above the first reference value $V_1$, as seen in waveform 62a of FIG. 4, then the first and second comparators 602 and 612 and the counter 630 all generate low signals, as seen in waveforms 602a, 612a and 630a of FIG. 4. In this state, the number of the cylinders on which the engine operates is dependent upon engine load and the air/fuel ratio is controlled to the stoichiometric value.

When the catalytic converter temperature increases above the first predetermined value $T_1$ and the output of the temperature sensor 62 falls below the first reference voltage $V_1$, as seen in waveform 62a of FIG. 4, the output of the first comparator 602 changes to its high level, as seen in waveform 602a of FIG. 4, to lean out the air/fuel ratio to a level corresponding to the constant $K_1$ and also to force the split engine operating circuit 54 to shift the engine operation into its split engine mode. Simultaneously, the first reference voltage $V_1$ is increased to a value $V_1'$.

If the catalytic converter temperature further increases above the second predetermined value $T_2$ and the output of the temperature sensor 62 further falls below the second reference voltage $V_2$, as seen in waveform 62a of FIG. 4, the output of the second comparator 612 changes to its high level, as seen in waveform 612a of FIG. 4, to further lean out the air/fuel ratio to a level corresponding to the constant $K_2$. Simultaneously, the second reference voltage $V_2$ is increased to a value $V_2'$ which may be equal to the increased first reference voltage $V_1'$. In this state, the engine operation is held in the split engine mode and the catalytic converter temperature decreases.

When the catalytic converter temperature decreases and the output of the temperature sensor 62 exceeds the increased reference value $V_1'$ ($V_2'$), as seen in waveform 62a, the outputs of the first and second comparators 602 and 612 change to their low levels, as seen in waveform 602a and 612a of FIG. 4. In this state, the number of the cylinders on which the engine operates is dependent upon engine load and the air/fuel ratio is controlled to a stoichiometric value.

If the number of occurrence of the first command signal (high level signal) from the first comparator 602 reaches a predetermined value (in the illustrated case, 3), the output of the counter 630 changes to a high level, as seen in waveform 630a of FIG. 4, increasing the first and second reference voltages $V_1$ and $V_2$ to a value sufficient to force the first and second comparators 602 and 612 to provide high outputs, as seen in waveforms 602a and 612a of FIG. 4. In this state, the engine operation is held in its split engine mode and the air/fuel ratio is controlled to the level corresponding to the constant $K_2$. As a result, the catalytic converter temperature decreases.

Figure 5:
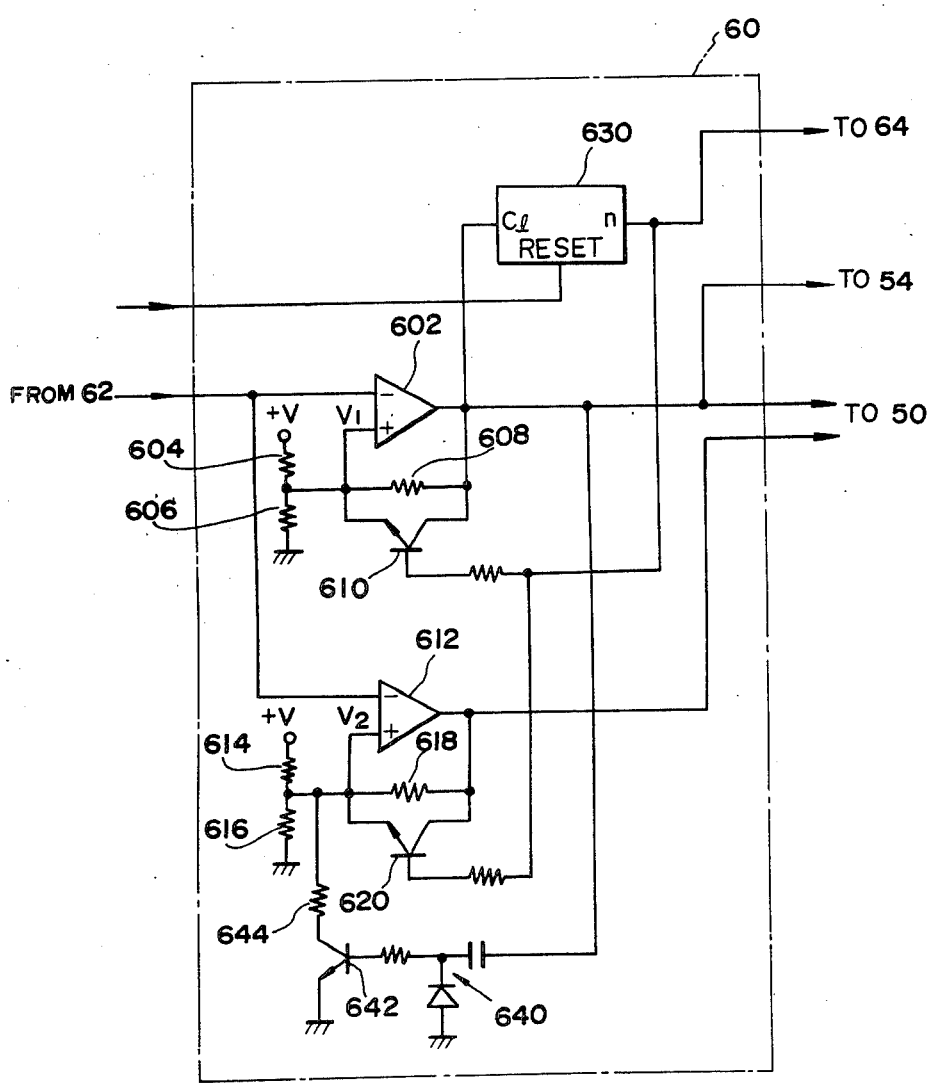
FIG. 5 is a circuit diagram showing a modified form of the emergency circuit of FIG. 2.

Referring to FIG. 5, there is illustrated a second embodiment of the present invention which is substantially similar to the first embodiment except that means are further provided for dropping the second reference voltage $V_2$ to a predetermined value for a constant period of time upon the occurrence of the first command signal from the first comparator 602. The means comprises a circuit 640 which receives the first command signal from the first comparator 602 and differentiates it. The output of the differentiating circuit 640 is coupled to the base of a third transistor 642, the collector of which is connected through a resistor 644 to the positive input of the second comparator 612 and the emitter thereof being grounded. When the first comparator 602 generates a first command signal (high level signal), the differentiating circuit 640 turns the third transistor 642 on to connect the positive input of the second comparator 612, thereby dropping the second reference voltage $V_2$ to a predetermined value; that is, increasing the second predetermined temperature value, for a constant time period determined by the time constant of the differentiating circuit 640.

With particular reference now to FIG. 6, the operation of the emergency circuit 60 of this embodiment will be further described.

When the output of the temperature sensor 62 falls below the first reference voltage $V_1$, as seen in waveform 62a of FIG. 6, the output of the first comparator 602 changes to a high level, as seen in waveform 602a of FIG. 6, to lean out the air/fuel ratio to a level corresponding to the constant $K_1$ and also to increase the first reference voltage to a value $V_1'$. Simultaneously, the third transistor 642 turns on to drop the second reference voltage $V_2$ to a predetermined value $V_2''$. Unless the output of the temperature sensor 62 falls below the dropped second reference voltage $V_2''$ and is below the second reference voltage $V_2$, upon termination of the "on" time of the third transistor 642, the air/fuel ratio is continuously determined based upon the constant $K_1$ even though the output of the temperature sensor 62 falls below the second reference voltage $V_2$ during the "on" time of the third transistor 642. Accordingly, if the stop valve 40 is in its closed position, the catalytic converter temperature will decreases below the second predetermined temperature value $T_2$; that is, the output of the temperature sensor 62 will increase above the second reference voltage $V_2$ upon termination of the "on" time of the third transistor 642 with the result that the air/fuel ratio is held at the value corresponding to the value $K_1$.

When the output of the temperature sensor 62 exceeds the increased first reference voltage $V_1'$ as seen in waveform 62a of FIG. 6, the output of the first comparator 602 changes to its low level, as seen in waveform 602a of FIG. 6, to return the air/fuel ratio to a stoichiometric level and also return the first reference voltage to its initial value $V_1$.

If the stop valve 40 is in its open position, the catalytic converter temperature will be above the second predetermined value; that is, the output of the temperature sensor 62 will be below the second reference value $V_2$ upon the termination of the "on" time of the third transistor 642. As a result, the output of the second comparator 612 changes to its high level, as seen in waveform 612a of FIG. 6, to further lean out the air/fuel ratio to a level corresponding to the constant $K_2$.

While the present invention has been described as leaning out the air/fuel ratio by reducing the amount of fuel supplied to the cylinders, it is to be understood that air may be introduced into the cylinders through a conduit bypassing the airflow meter 14 in order to lean out the air/fuel ratio.

While the present invention has been described in connection with a six cylinder engine, it is to be noted that the particular engine shown is only illustrative purposes and the structure of this invention could be readily applied to any split engine structure. In addition, while the present invention has been described in connection with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. An internal combustion engine comprising:
   (a) first and second cylinder units each including at least one cylinder;
   (b) a control circuit responsive to engine load for supplying a mixture of an optimum air/fuel ratio to said first and second cylinder units and for terminating the supply of the mixture to said second cylinder unit when the engine load is below a given value;
   (c) an exhaust system having therein a catalytic converter for removing pollutants from the exhaust gases flowing therethrough from said cylinders; and
   (d) an emergency circuit responsive to an increase in the temperature of said catalytic converter for forcing said control circuit to lean out the air/fuel ratio, said emergency circuit comprising:

a first comparator for comparing the temperature of said catalytic converter with a first reference value and providing a first command signal when the former is higher than the latter, said first comparator adapted to decrease the first reference value to a given level upon the occurrence of the first command signal;

a second comparator for comparing the temperature of said catalytic converter with a second reference value higher than the first reference value and providing a second command signal when the former is higher than the latter, said second comparator adapted to decrease the second reference value to a given level upon the occurrence of the second command signal; and said control circuit being responsive to the first command signal for leaning out the air/fuel ratio to a first predetermined level and terminating the supply of the mixture to said second cylinder unit, said control circuit being responsive to the second command signal for leaning out the air/fuel ratio to a second predetermined level leaner than the first predetermined level.

2. An internal combustion engine according to claim 1, which further comprises means responsive to the first command signal for increasing the second reference value to a predetermined level for a predetermined period of time.

3. An internal combustion engine according to claim 1, which further comprises means for decreasing the first and second reference values to a sufficient level to force said first and second comparators to produce the first and second command signals when the number of occurrence of the first command signal exceeds a predetermined value.

4. An internal combustion engine according to claim 3, wherein said means is adapted to provide an alarm when the number of occurrence of the first command signal exceeds the predetermined value.

5. An internal combustion engine according to claim 3, which further comprises means responsive to the first command signal for increasing the second reference value to a predetermined level for a predetermined period of time.

* * * * *